Figure 1:
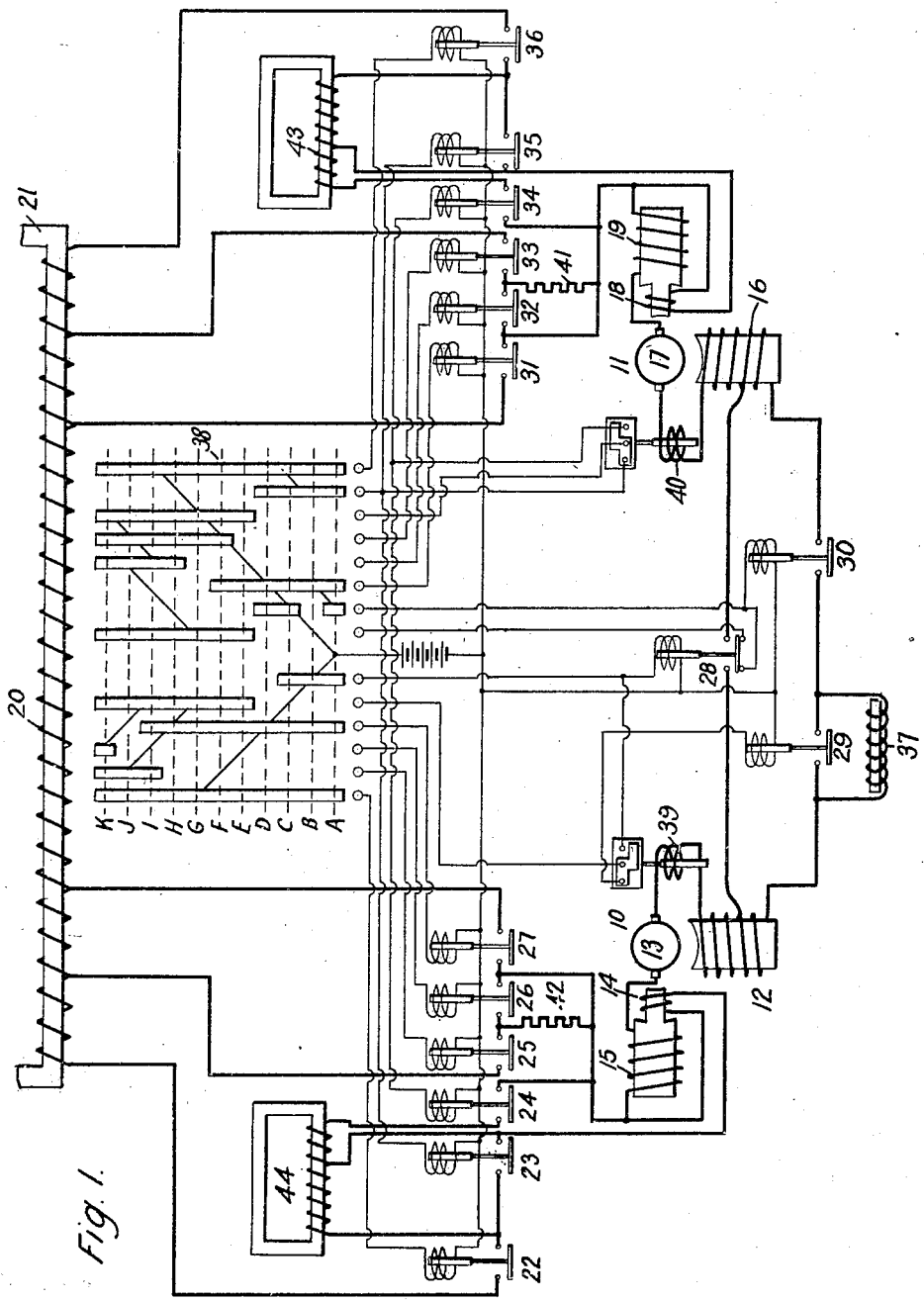

R. E. HELLMUND.
CONTROL SYSTEM FOR DYNAMO ELECTRIC MACHINES.
APPLICATION FILED NOV. 29, 1915.

1,255,419.

Patented Feb. 5, 1918.
2 SHEETS—SHEET 1.

WITNESSES:
Fred H. Miller
O. C. Davis.

INVENTOR
Rudolf E. Hellmund
BY
Wesley G. Carr
ATTORNEY

R. E. HELLMUND.
CONTROL SYSTEM FOR DYNAMO ELECTRIC MACHINES.
APPLICATION FILED NOV. 29, 1915.
1,255,419.
Patented Feb. 5, 1918.
2 SHEETS—SHEET 2.
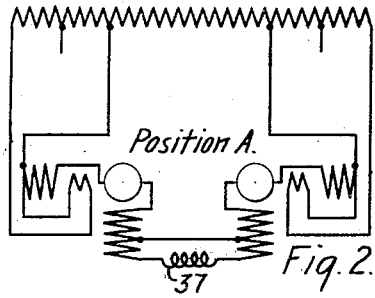
Fig. 2. Position A.
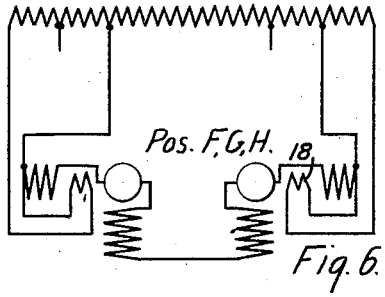
Fig. 6. Pos. F,G,H.
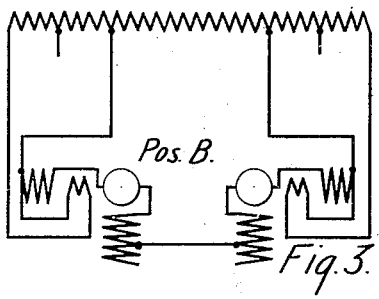
Fig. 3. Pos. B.
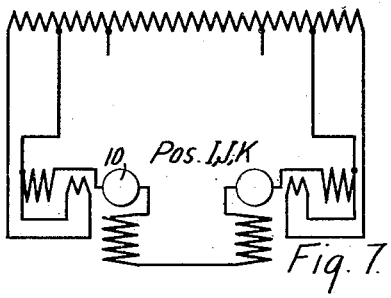
Fig. 7. Pos. I,J,K.
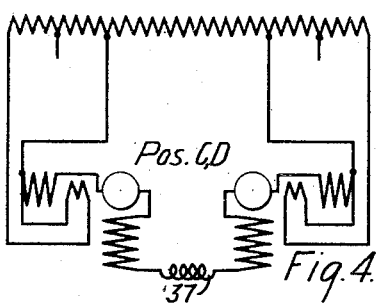
Fig. 4. Pos. C,D.
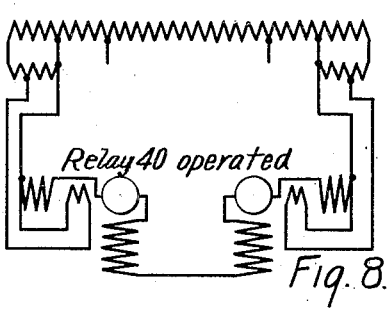
Fig. 8. Relay 40 operated.
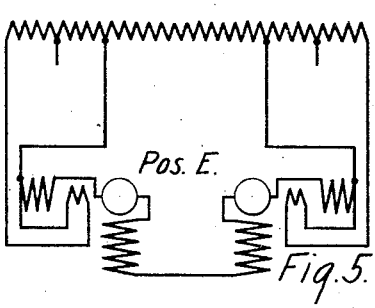
Fig. 5. Pos. E.
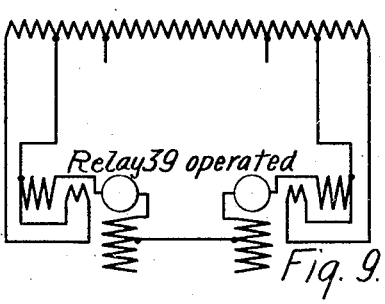
Fig. 9. Relay 39 operated.
WITNESSES:
Fred A. Lind.
D. C. Davis.
INVENTOR
Rudolf E. Hellmund
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR DYNAMO-ELECTRIC MACHINES.

1,255,419.

Specification of Letters Patent. Patented Feb. 5, 1918.

Application filed November 29, 1915. Serial No. 63,973.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Control Systems for Dynamo-Electric Machines, of which the following is a specification.

My invention relates to control systems for alternating current motors of the commutator type, and it has for its object to provide means whereby motors of the character indicated may be accelerated and otherwise controlled in a smooth and uniform manner and with substantially sparkless commutation.

In the accompanying drawing, Figure 1 is a diagrammatic view of a plurality of alternating-current motors of the compensated, commutator type, together with their attendant supply and control systems, embodying the preferred form of my invention, and Figs. 2 to 9, inclusive, are simplified diagrammatic views, illustrating different phases in the development of the connections in the system of Fig. 1.

In the operation of alternating-current motors of the commutator type, it is requisite that the exciting field be greatly weakened at the time of starting in order to reduce the transformer action in the short circuited armature coils undergoing commutation. I attain this object not only by eliminating a portion of the exciting field winding at low speeds but also by short circuiting said eliminated turns so that a counter magneto-motive force is established therein, tending to neutralize the exciting field.

It is also desirable, at high speeds, to reduce the exciting field magnetization during heavy-current overloads in order to eliminate high transformer electromotive forces and consequent sparking in the short circuited armature coils, and I attain this object by employing the same apparatus that is used for controlling the exciting field strength at starting, the only difference being that, during starting, the exciting field strength is necessarily reduced because of certain features of the control system, whereas, at high speeds, the exciting field strength is reduced automatically by the action of a line switch operating under the influence of excessive load current.

When a motor of the character indicated is operating at or near full speed, sparking will ensue at light load because of overcompensation through over-excitation of the commutating field windings, and therefore, I provide, in addition, automatic means, under the control of an additional line switch, for reducing the excitation of the commutating field windings when the load current falls below a predetermined value.

For a more detailed understanding of my invention, attention is directed to the drawing in Fig. 1 of which I show a pair of alternating-current commutator motors at 10 and 11, respectively. The motor 10 is provided with an exciting field winding 12, an armature 13, a commutating winding 14 and a compensating field winding 15. In like manner, the motor 11 is provided with an exciting field winding 16, an armature 17, a commutating winding 18 and a compensating field winding 19. Energy for the operation of the motors 10 and 11 is derived from a suitable alternating-current source, such, for example, as the secondary winding 20 of a transformer 21, the motors 10 and 11 being connected in series relation across said source through suitable switches 22 to 36, inclusive. The exciting field windings 12 and 16 are immediately adjacent to each other in said series connection, as in my copending applications, Serial Nos. 54,540 and 54,541, filed Oct. 7, 1915, and by connecting together intermediate points therein through the switch 28, portions thereof may be eliminated from the main-current path. The eliminated portions may then be short circuited through an inductive device 37 in order to establish a counter-magnetomotive force in the exciting field poles. The voltage applied to the motors 10 and 11 from the source 20 may be varied in the usual manner by the operation of the switches 22 to 36, inclusive, by controller 38, as will hereinafter be pointed out more in detail. High and low-current relays 39 and 40, respectively, are provided for the automatic alteration of the motor connections during excessively large and excessively small load currents, respectively.

Having thus described a system embodying my invention, the operation is as follows. At the outset, by moving the controller to the position A, switches 22, 23, 27, 28, 30, 31, 35 and 36 are operated, estab- lishing the connections shown in Fig. 2 whereby the motors are connected in series relation, with a maximum voltage impressed upon the commutating field windings and a minimum voltage impressed upon the exciting field windings, a large portion of the exciting field windings being shunted out of said series circuit and said shunted portions being short circuited through the inductive device 37 for the production of a counter-magnetomotive force.

The movement of the controller 38 to the position B opens the switch 30, establishing the connection shown in Fig. 3 wherein said counter-magnetomotive force is eliminated.

In the positions C and D, the switch 28 is opened and the switch 30 again closed, establishing the connections shown in Fig. 4 wherein the entire exciting field windings are included in circuit in series with the inductive device 37 which acts merely as a current-reducing medium, and movement of the controller to the position E closes the switch 29 eliminating said device 37.

In the positions F, G and H, the switches 31, 32 and 33, together with a preventive device 41, are manipulated in a well known manner to reduce the voltage supplied to the commutating winding 18 and to increase the total voltage applied to the exciting motor windings, as shown in Fig. 6. In like manner, the switches 25, 26 and 27, together with a preventive device 42, are manipulated in positions I, J and K to produce a like change in the voltages applied to the motor 10, as shown in Fig. 7, and bring the motor to its full-speed connections for normal load currents.

In order to reduce the strength of the commutating fields produced by the windings 14 and 18 when the load current falls below a predetermined value during the accelerating positions E to K, inclusive, I employ the low-current relay 40, together with auxiliary auto-transformers 43 and 44. The core of the relay 40 is drawn up at normal loads, the energizing windings of the switches 23 and 35 being closed through the control board of said relay 40 during said accelerating positions, permitting the direct connection of the commutating windings to the main source, as shown in Figs. 5, 6 and 7. If, however, during the accelerating positions E to K, inclusive, the line current falls below a predetermined value, the control board of the relay 40 falls, opening the switches 23 and 35 and closing the switches 24 and 34, impressing upon the primary turns of the auto-transformers 43 and 44 the same voltage as that previously applied directly to the commutating windings and supplying said windings with a reduced voltage from the secondary turns of said auto-transformers, all as indicated in Fig. 8, marked "Relay 40 operated".

In order to reduce the exciting field strength during excessive load current occurring in the accelerating positions E to K, inclusive, the high-current relay 39 has its operating coil inserted in the main circuit and is adjusted so that, at normal current, the core thereof is not drawn up, the switch 29 thus being closed through the control board of said relay 39 during the positions E to K, inclusive, and maintaining the exciting field strength at full value. If, however, the load current exceeds the setting of the relay 39 during said positions, the energizing circuit of the switch 29 is opened and that of the switch 28 is closed, in turn breaking the energizing circuit of the switch 30. There is thus established the connections shown in Fig. 9, indicated as "Relay 39 operated". The weakening of the exciting field strength causes an increase in the speed but, by careful design, considerable improvement in the commutation may be effected without serious speed alteration. If, however, it is desired to maintain substantially constant speed, means may be provided for decreasing the motor voltage when the exciting field is automatically weakened, as disclosed and claimed in my copending application, Serial No. 63,974, filed concurrently herewith.

While I have shown my invention in its preferred form, it will be obvious to those skilled in the art that it is susceptible of various minor changes and modifications without departing from the spirit thereof, and I desire, therefore, that only such limitations shall be placed thereupon as are imposed by the prior art or are specifically set forth in the appended claims.

I claim as my invention:

1. The combination with an alternating-current motor of the commutator type provided with an exciting field winding, of an inductive device, means for short circuiting a portion of said exciting field winding through said inductive device, and means for eliminating said portion of said winding and said inductive device from the main current path.

2. The combination with a pair of alternating current motors of the commutator type connected in series relation, with their exciting field windings immediately adjacent, of means for connecting together intermediate points in said exciting field windings, thus eliminating certain portions thereof from the main-current path, and means for short circuiting said eliminated portions.

3. The combination with a pair of alternating-current motors of the commutator type connected in series relation, with their exciting field windings immediately adjacent, of means for connecting together intermediate points in said exciting field windings, thus eliminating certain portions thereof from the main-current path, an inductive device, and means for short circuiting said eliminated portions through said inductive device.

4. The combination with an alternating-current motor of the commutator type provided with an exciting field winding, of a source of alternating current, means for changing the speed of said motor by varying the connections of said motor to said source, and means for automatically weakening the excitation of said exciting field winding when the load current exceeds predetermined amounts.

5. The combination with an alternating-current motor of the commutator type provided with an exciting field winding, of a source of alternating current, means for changing the speed of said motor by altering the connections of said motor to said source, and means for automatically weakening the excitation of said exciting field windings during the accelerating steps when the load current exceeds a predetermined value.

6. The combination with an alternating-current motor of the commutator type provided with a commutating winding, of a source of alternating current to which said winding is directly connected, means for altering the connections of said motor to said source for changing the speed thereof, an auxiliary transformer, and automatic means for interposing said auxiliary transformer between said commutating winding and said source, said auxiliary transformer being adapted to provide a reduced excitation for said winding during abnormally small-load-current conditions at certain speeds.

7. The combination with an alternating-current motor of the commutator type provided with a separately excited compensating winding, of means for adjusting the connections of said winding to said source during acceleration, and means for automatically reducing the excitation of said winding when the load current falls below a predetermined minimum value.

In testimony whereof, I have hereunto subscribed my name this 22nd day of Nov., 1915.

RUDOLF E. HELLMUND.

Copies of this patent may be obtained for five cents each, by addressing the "Commissioner of Patents, Washington, D. C."